United States Patent
Cunningham

(10) Patent No.: US 6,427,127 B1
(45) Date of Patent: Jul. 30, 2002

(54) VIBRATING CONDUIT PROCESS PARAMETER SENSORS, OPERATING METHODS AND COMPUTER PROGRAM PRODUCTS UTILIZING COMPLEX MODAL ESTIMATION

(75) Inventor: Timothy J. Cunningham, Boulder, CO (US)

(73) Assignee: Micro Motion, Inc., Boulder, CO (US)

(*) Notice: Subject to any disclaimer, the term of this patent is extended or adjusted under 35 U.S.C. 154(b) by 0 days.

(21) Appl. No.: 09/116,389

(22) Filed: Jul. 16, 1998

(51) Int. Cl.[7] .............................. G01F 1/00; G01F 7/00; G06F 19/00

(52) U.S. Cl. ........................... 702/45; 702/54; 702/189; 73/861.356

(58) Field of Search ............................ 702/45–48, 50, 702/54, 100, 104, 189; 73/861.355, 861.356, 861.357

(56) References Cited

U.S. PATENT DOCUMENTS

| | | | |
|---|---|---|---|
| 4,777,833 A | 10/1988 | Carpenter | 73/861.38 |
| 5,009,109 A | 4/1991 | Kalotay et al. | 73/861.38 |
| 5,301,557 A | 4/1994 | Cage et al. | 73/861.38 |
| 5,429,002 A * | 7/1995 | Colman | 73/861.356 |
| 5,734,112 A | 3/1998 | Bose et al. | 73/861.56 |

FOREIGN PATENT DOCUMENTS

| | | |
|---|---|---|
| EP | 0 578 113 A2 | 1/1984 |
| EP | 0 701 107 A2 | 3/1996 |
| EP | 0702212 A2 * | 3/1996 |
| EP | 0791807 A2 | 8/1997 |
| WO | WO 92/14123 | 8/1992 |
| WO | WO 95/16897 | 6/1995 |
| WO | WO 95/29385 | 11/1995 |
| WO | WO 97/40348 | 10/1997 |
| WO | WO 98/07009 | 2/1998 |

OTHER PUBLICATIONS

Cunningham; "Zero Shifts Due to Non–Proportional Damping", Micro Motion Report #10233, Part of IMAC XV, Feb. 1997, Session 8j, Structural Damping.

Bosse et al.; "Application of Modal Filtering Techniques to Vibration Control of Precision Truss", AD–vol. 45/MD–vol. 54, Adaptive Structures and Composite Material, Analysis and Application ASME 1994, pp. 281–285.

Cunningham; "Zero Shifts in Coriolis Sensors Due to Imbalance", Procedings of AIAA/ASME/ASCE/AHS/ASC 35th Structures, Structural Dynamics and Materials Conference, Apr. 18–20, 1994, AIAA pp. 94–1621 (A94–24311a).

Stack, Garnett, Pawlas; "A Finite Element for the Vibration Analysis of Fluid–Conveying Timoshenko Beam", AIAA Paper 93–1552, pp. 1–10 (1993).

Timothy J. Cunningham, Modal Analysis and Zero Stability of Coriolis Mass Flowmeters (1993) (M. of Science Thesis, Colorado State University (Fort Collins)).

Rieder, Drahm; "A New Type of Single Straight Tube Coriolis Mass Flowmeter", Flomenko '96, presented at the 8th International Conference (1996), p. 250–255.

Stuart J. Shelley, Investigation of Discrete Modal Filters For Structural Dynamic Applications (1991) (Unpublished Ph.D. Dissertation, University of Cincinnati).

* cited by examiner

Primary Examiner—Marc S. Hoff
Assistant Examiner—Manuel L. Barbee
(74) Attorney, Agent, or Firm—Faegre & Benson LLP

(57) ABSTRACT

A process parameter such as mass flow is determined in a vibrating conduit process parameter sensor using a complex modal transformation estimated from a plurality of motion signals representing motion of the parameter sensor conduit. According to an aspect of the invention, a complex eigenvector is provided representing motion of the conduit at the plurality of locations at a known mass flow. A plurality of motion signals is received from a plurality of motion transducers, the plurality of motion signals indicating motion at a plurality of locations on the conduit as a material flows through the conduit. A complex modal transformation relating the received plurality of motion signals to the complex eigenvector is estimated. Mass flow through the conduit is estimated from the known mass flow and the estimated complex modal transformation. Related apparatus and computer program products are also discussed.

50 Claims, 5 Drawing Sheets

VIBRATING CONDUIT PROCESS PARAMETER SENSORS, OPERATING METHODS AND COMPUTER PROGRAM PRODUCTS UTILIZING COMPLEX MODAL ESTIMATION

BACKGROUND OF THE INVENTION

1. Field of the Invention

This invention pertains to process parameter sensors and related operating methods and program products, and more particularly, to vibrating conduit process parameter sensors and related operating methods and computer program products.

2. Statement of the Problem

Coriolis effect mass flowmeters are commonly used to measure mass flow and other information for materials flowing through a conduit. Exemplary Coriolis flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters typically include one or more conduits having a straight or a curved configuration. Each conduit may be viewed as having a set of vibration modes, including, for example, simple bending, torsional, radial and coupled modes. In a typical mass flow measurement application, each conduit is driven to oscillate at resonance in one of its natural modes as a material flows through the conduit. The vibration modes of the vibrating, material-filled system are affected by the combined mass and stiffness characteristics of the conduits and the characteristics of the material flowing within the conduits.

A typical component of a Coriolis flowmeter is the drive or excitation system. The drive system operates to apply a periodic physical force to the conduit that causes the conduit to oscillate. The drive system typically includes at least one actuator mounted to the conduit(s) of the flowmeter. The actuator typically contains one of many well known electromechanical devices, such as a voice coil device having a magnet mounted to a first conduit and a wire coil mounted to a second conduit, in an opposing relationship to the magnet. A drive circuit continuously applies a periodic, e.g., a sinusoidal or square wave, drive signal to the actuator coil. The periodic drive signal causes the actuator to drive the two conduits in an opposing periodic pattern that is thereafter maintained.

When there is effectively "zero" flow through a driven flowmeter conduit, points along the conduit tend to oscillate with approximately the same phase or a "zero-flow" phase with respect to the driver, depending on the mode of the driven vibration. As material begins to flow from an inlet of the flowmeter, through the conduit and out of an outlet of the flowmeter, Coriolis forces arising from the material flow tend to induce phase shifts between spatially separate points along the conduit. Generally, as material flows through the conduit, the phase on the inlet side of the conduit lags the driver, while the phase on the outlet side of the conduit leads the driver. The phase shift induced between two locations on the conduit is approximately proportional to the mass flow rate of material through the conduit.

To measure mass flow rate, conventional Coriolis flowmeters typically measure phase at two transducers located near respective ends of the conduit, symmetrically placed with respect to a centrally positioned driver. However, manufacturing-induced asymmetries in transducer placement as well as other structural asymmetries and nonlinearities in the conduit structure may cause measurement inaccuracies. In addition, in some applications it may be desirable to utilize asymmetric transducer placements.

SUMMARY OF THE INVENTION

In light of the foregoing, it is an object of the present invention to provide process parameter sensors and related operating methods and computer program products that can provide more flexible and accurate techniques for measurement of process parameters such as mass flow rate, totalized mass flow and the like.

This and other objects, features and advantages are provided according to the present invention by vibrating conduit process parameter sensors and related operating methods and computer program products in which a process parameter associated with a material in a conduit of a sensor is estimated based on an estimated complex modal transformation. For example, an unknown mass flow may be estimated by estimating a complex modal transformation relating motion signals representing motion of the process parameter sensor conduit at the unknown mass flow to a complex eigenvector representing motion of the process parameter sensor conduit at the known mass flow. A plurality of complex measured values may be generated from the motion signals, and then used to estimate the complex modal transformation according to a best-fit technique such as a linear regression. According to an aspect of the present invention, motion signals representing motion at more than two locations are received, providing an overdetermined set of measurement data that can be used to produce a more accurate process parameter estimate. Complex modal transformation and process parameter estimation operations may be implemented in a microprocessor, digital signal processor (DSP) or similar computer.

By using a complex modal representation of the motion of a sensor conduit, the present invention can provide more flexible and accurate techniques for measuring process parameters such as mass flow in comparison to conventional measurement techniques. According to the present invention, a At variety of different types of measurements can provide the needed complex information. In addition, the estimation techniques utilized according to the present invention are well suited to using overdetermined sets of measurements.

In particular, according to the present invention, a process parameter is estimated by a parameter sensor having a conduit configured to contain material from a material processing system. A plurality of motion signals is received from a plurality of motion transducers. Each of the plurality of motion signals indicating indicates motion at one of a plurality of locations on the conduit. A complex modal transformation is estimated from the received plurality of motion signals, and a process parameter for the material processing system is estimated from the estimated complex modal transformation.

According to an aspect of the present invention, a complex eigenvector is provided representing the motion of the conduit at a plurality of locations at a known mass flow. A plurality of motion signals is received from the plurality of motion transducers, the plurality of motion signals indicating motion at a plurality of locations on the conduit as a material flows through the conduit. A complex modal transformation relating the received plurality of motion signals to the complex eigenvector is estimated. Mass flow through the conduit is estimated from the known mass flow and the estimated complex modal transformation.

According to another aspect of the present invention, a plurality of complex measured values is generated from the received plurality of motion signals, a respective one of the plurality of complex measured values corresponding to a respective one of the plurality of locations. A complex modal transformation relating the generated plurality of complex measured values to the complex eigenvector is estimated. According to another aspect of the present invention, a complex modal transformation is estimated by constructing a complex vector from the generated plurality of complex measured values, and by determining a scaled rotation relating the complex vector to the complex eigenvector.

According to yet another aspect of the present invention, a transformation which best fits the plurality of complex measured values to the complex eigenvector is determined, and mass flow is estimated from the known mass flow according to the determined transformation. Determination of a best fit transformation may include performing a linear regression to determine a transformation which best fits the plurality of complex measured values to the complex eigenvector.

According to spatial integration aspects of the present invention, a plurality of motion signals is received representing motion at more than two physically separate locations. A complex modal transformation is then estimated, relating the plurality of motion signals representing motion at the more than two physically separate locations to the complex eigenvector.

According to calibration aspects of the present invention, a plurality of motion signals are received from the plurality of motion transducers, the plurality of motion signals indicating motion at the plurality of locations at a known mass flow. A complex eigenvector is determined from the received plurality of motion signals, and a representation of the complex eigenvector is stored in the process parameter sensor.

A process parameter sensor according to the present invention includes a conduit configured to contain material from a material processing system. A plurality of motion transducers is operative to produce a plurality of motion signals indicating motion at a plurality of locations on the conduit. A complex modal transformation estimator is responsive to the plurality of motion transducers, configured to receive a plurality of motion signals from the plurality of motion transducers and operative to estimate a complex modal transformation from the received plurality of motion signals. A process parameter estimator is responsive to the complex modal transformation estimator and operative to estimate a process parameter for the material processing system from the estimated complex modal transformation. In an embodiment of the present invention, the complex modal transformation estimator comprises means for estimating a complex modal transformation relating the received plurality of motion signals to a complex eigenvector representing motion of the conduit at a known mass flow. The process parameter estimator comprises means for estimating mass flow through the conduit from the known mass flow and the estimated complex modal transformation.

According to another aspect of the present invention, a computer program product for determining a process parameter associated with a material in a conduit of a parameter sensor includes first computer readable program code means for receiving a plurality of motion signals representing motion at a plurality of locations on the conduit. Second computer readable program code means are responsive to the first computer readable program code means and estimate a complex modal transformation from the received plurality of motion signals. Third computer readable program code means are responsive to the second computer readable program code means and estimate a process param-eter associated with a material in the conduit from the estimated complex modal transformation. Improved process parameter measurements may thereby be provided.

DETAILED DESCRIPTION OF EMBODIMENTS

Figure 1:
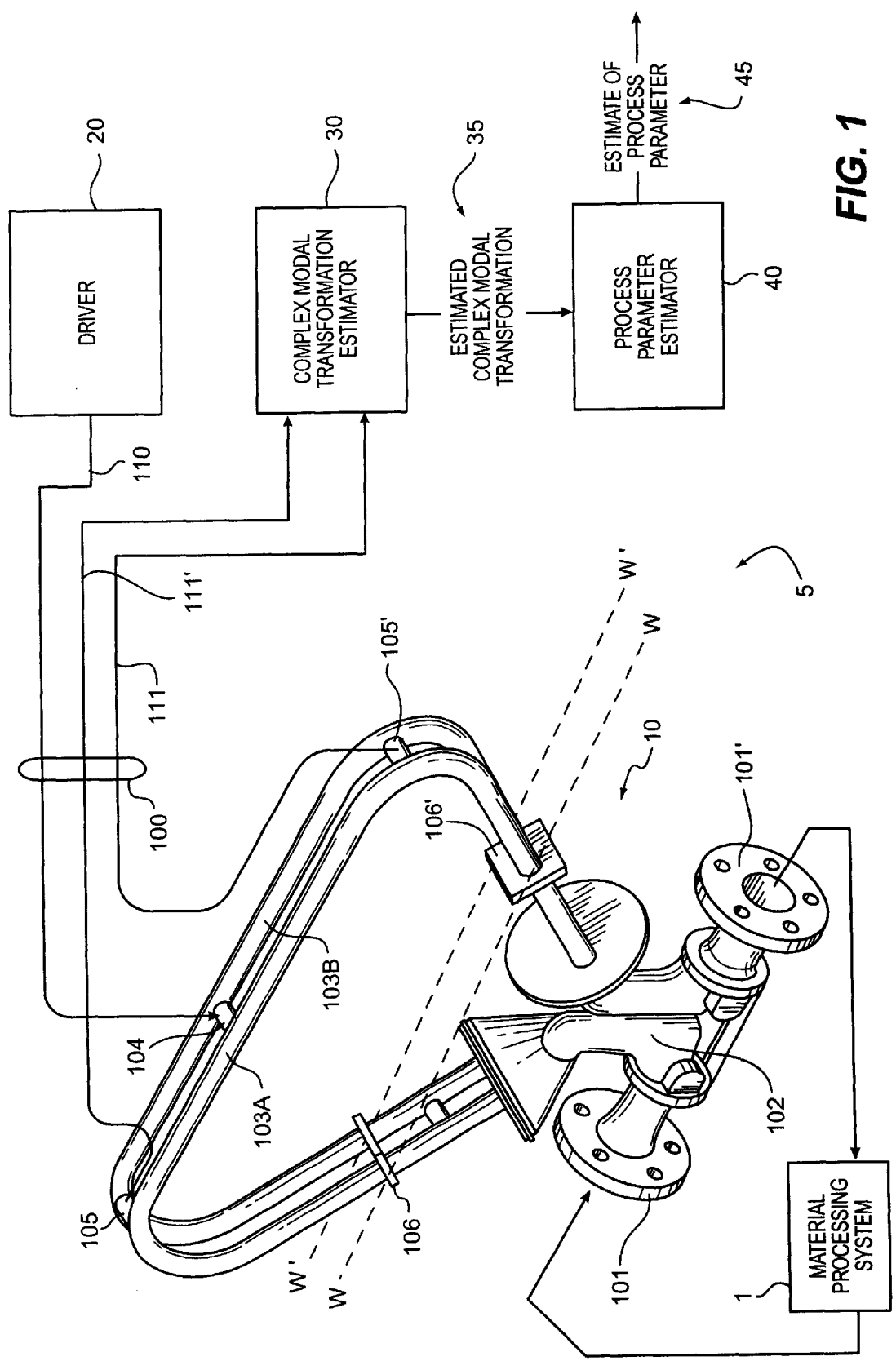
FIG. 1 illustrates an embodiment of a process parameter sensor according to the present invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

The following discussion refers to Coriolis flowmeters in which a process parameter of a material processing system, typically mass flow rate, is estimated for a material, e.g., a fluid, flowing through a vibrating conduit configured to contain a material which passes through the vibrating conduit as part of the material processing system. Those skilled in the art will appreciate, however, that the present invention is also applicable to vibrating conduit process parameter sensors other than in-line sensors. For example, in addition to in-line type mass flowmeters, the present invention is applicable to sampling-type vibrating-tube densitometers which include a conduit configured to contain a sample of a material extracted from a material processing system.

Determination of a Process Parameter Using Complex Modal Estimation

FIG. 1 shows an exemplary embodiment of a process parameter sensor 5 according to the present invention. The process parameter sensor 5 includes a conduit assembly 10. The conduit assembly 10 includes an inlet flange 101, an outlet flange 101', a manifold 102 and first and second conduits 103A, 103B. Brace bars 106,106' connect the conduits 103A, 103B. Connected to the conduits 103A, 103B is an actuator 104 that is operative to vibrate the conduits 103A, 103B responsive to a driver 20. First and second motion transducers 105, 105' are operative to produce motion signals representing motion at spatially separate locations on the conduits 103A, 103B. The motion transducers 105, 105' may include a variety of devices, such as coil-type velocity transducers, optical or ultrasonic motion sensors, accelerometers, inertial rate sensors and the like. Leads 100 are connected to the actuator 104 and the motion transducers 105, 105'.

When the conduit assembly 10 is inserted into a material processing system 1, material flowing in the material processing system 1 enters the conduit assembly 10 through the inlet flange 101. The material then flows through the manifold 102, where it is directed into the flow tubes 103A, 103B. After leaving the flow tubes 103A, 103B, the material flows back into the manifold 102 and exits the meter assembly 10 through the outlet flange 101'. As the material flows through the conduits 103A, 103B, it gives rise to Coriolis forces that perturb the conduits 103A, 103B.

The conduits 103A, 103B are typically driven by the actuator 104 in opposite directions about their respective bending axes W—W and W'—W', inducing what is commonly referred to as a first out of phase bending mode in the conduit assembly 10. The actuator 104 may comprise any one of many well-known devices, such as a linear actuator including a magnet mounted to the first conduit 103A and an opposing coil mounted to the second flow tube 103B. An alternating current induced by a drive signal provided by a driver 20 via a drive lead 110 passes through the coil, generating mechanical force that vibrates the conduits 103A, 103B. Although the process parameter sensor 5 illustrated in FIG. 1 is shown as including an integral actuator 104, those skilled in the art will appreciate that vibration of the conduits 103A, 103B according to the present invention may be achieved by other techniques, such as by an excitation generated external to the conduit assembly 10 and conveyed to the conduit assembly 10, via one of the flanges 101,101'.

Steady-state motion of a vibrating process parameter sensor conduit at zero mass flow can be described as a real normal eigenvector associated with the fundamental mode excited by the driver. In the case of a dual-conduit sensor such as that illustrated in FIG. 1, this mode typically is a first out-of-phase bending mode in which the two conduits 103A, 103B bend about the axes W—W, W'—W'. Under this assumption, the motion of a discrete set of points $\{x\}$ on the conduits 103A, 103B can be described by the equation:

$$\{x\}(t) = \alpha \{\phi\}_d \cos(\omega_d t), \quad (1)$$

where $\{\phi\}_d$ represents a real, normal eigenvector associated with the drive mode, and $\omega_d$ is a natural frequency associated with the drive mode. The scalar $\alpha$ scales the eigenvector $\{\phi\}_d$ to match the amplitude of the vibration. At a given time t, the motion of any point on the conduit can be directly determined.

A more complete representation of operation of a vibrating conduit process parameter sensor may be provided by viewing the process parameter sensor as a system operating in a state of forced response. The forced response may be modeled as a superposition of a plurality of real normal modal responses $\eta$. According to such a model, $$\{x\}(t) = [\Phi]\{|\eta|\cos(\omega_d t - \text{ang}(\eta))\}, \quad (2)$$

$$\{x\} = [\Phi]\{\eta\},$$

$$\{\eta\} = [\Phi]^{-1}\{x\},$$

$$\{x\} = [H]\{F\},$$

and $$\{\eta\} = [\Phi]^{-1}[H]\{F\}, \quad (3)$$

where $\{\eta\}$ is a modal response vector, $\{F\}$ is a forcing function vector, $[H]$ is a frequency response function (FRF) matrix and $[\Phi]^{-1}$ is an inverse of a mode shape matrix $[\Phi]$. As can be seen from Equation (1), each term of the vector $\{x\}$ has a phase associated therewith. With zero flow through the conduit, if the force vector $\{F\}$ and the system characteristics embodied in the FRF matrix $[H]$ are known, measuring the phase at any one point on the conduit generally will yield the correct phase at any other point on the conduit.

The present invention arises from the realization that flowing material in a conduit may be represented as Coriolis forces which introduce complexity in a modal model of a conduit assembly. The Coriolis forces can be modeled using additional terms in the matrix associated with the velocity term in the linear differential equations describing the motion of the process parameter sensor conduit. When these Coriolis force terms are included in the eigenvalue representation of the conduit, the eigenvectors, i.e., the mode shapes, become complex. In detail, the linear differential equations of motions for the conduit become:

$$[M]\{\ddot{x}\} + [C]\{\dot{x}\} + [K]\{x\} = \{F\}, \quad (4)$$

where $[M]$ is a mass matrix, $[K]$ is a stiffness matrix, $\{F\}$ is an applied force vector, and $[C]$ is a matrix of Coriolis forces acting on the velocity term. Including the Coriolis matrix $[C]$ introduces complexity to the eigenvalue problem, i.e., results in complex eigenvectors.

Motion of a conduit with fluid flowing through the conduit can be modeled as a scaled complex eigenvector. A complex eigenvector has two independent components at each degree of freedom. These components may include real and imaginary components or, alternatively, magnitude and phase components. According to this model, the motion of the conduit can be described by a free response, i.e., the drive force can be neglected in the description of the motion. The motion of a discrete set of points $\{X\}$ on the conduit can be described by:

$$\{x\}(t) = \alpha \{|\phi_d|\cos(\omega_d t - \text{ang}(\phi_d))\}, \quad (5)$$

where $\{\phi\}_d$ is a complex eigenvector associated with the drive mode, $\omega_d$ is a natural frequency associated with the drive mode, and the scalar $a$ scales the magnitude of the eigenvector to match the amplitude of operation.

It can be assumed that $\alpha\{|\phi|_d\}$, the magnitude of the complex eigenvector, is controlled by the drive circuit that drives the transducer to a given amplitude. As $\text{ang}(\phi_d)$, the complexity of the eigenvector, is unknown, information about motion at two locations can be used to determine the Coriolis forces. Referring to Equation (3), the complex modal response $\{\eta\}$ involves the system characteristics, represented by the FRF matrix $[H]$, and the applied force vector $\{F\}$. It may be assumed that the applied force vector $\{F\}$ is known. However, the system characteristics, embodied in the FRF matrix $[H]$, are a function of the mass flow rate and thus are unknown. Additional information, e.g., phase at a point other than the driver, allows determination of the mass flow rate.

Complex modal measurement techniques as applied according to the present invention can provide greater flexibility in measuring process parameters such as mass flow than conventional methods. For example, if amplitude is precisely controlled at one location, e.g., the driver location, the amplitude or phase of another location can provide sufficient information for a mass flow calculation. Alternatively, amplitude measured simultaneously at two separate locations, each amplitude measurement being normalized to a maximum amplitude at the location, can provide sufficient information for a mass flow measurement.

The complexity of a mode may be viewed as a rotation of an eigenvector in the complex plane. Knowing the imaginary part of the eigenvector at any two locations can provide information on the mode shape complexity. The imaginary rotation is related to the mass flow. A meter is calibrated such that the rotation, i.e., a complex eigenvector, is known at a known mass flow. An unknown mass flow, e.g., an unknown mass flow rate, totalized mass flow or the like, may be determined by determining a corresponding complex vector and assuming that this vector corresponds to complex modal transformation of the calibrated complex eigenvector. The transformation may be estimated from the calibrated complex eigenvector and the measurement vector using, for example, a curve fitting technique. The estimated transformation may then be used to estimate the unknown mass flow from the known mass flow.

The calibrated complex eigenvector may be identified in a number of ways. For example, a sensor may be calibrated offline as part of a manufacturing process, with the calibrated complex eigenvector being stored in a programmable read-only memory (PROM) or other storage device in the process parameter sensors electronics. The calibrated complex eigenvector may be stored in a number of ways including, for example, by storing a plurality of values of the complex eigenvector or by storing a representation or approximation thereof. A process parameter sensor may also be calibrated in situ by passing material through the process parameter sensor at a known flow rate and determining the calibrated complex eigenvector by performing a complex modal analysis under control of a microprocessor or similar computing device. A number of computational techniques may be utilized to estimate the complex eigenvectors for a given flow rate and for computing the transformation relating complex eigenvectors representing different flow rates. These may include various curve-fitting techniques, such as regression techniques.

According to an aspect of the present invention, a generalized linear regression technique is used to determine mass flow. For example, in an application using transducers at two locations, a two-element vector $\{Y_e\}$ is constructed at a known mass flow rate:

$$\{Y_e\} = \begin{Bmatrix} y_1 \\ y_2 \end{Bmatrix}. \quad (6)$$

$\{Y_e\}$ could include, for example, phase measurements at the two transducer locations on the process parameter sensor conduit. With material flowing through the conduit at an unknown mass flow rate, another two element vector $\{X\}$ is constructed from complex measurements at the two transducer locations:

$$\{X\} = \begin{Bmatrix} x_1 \\ x_2 \end{Bmatrix}. \quad (7)$$

As described above, complex values may be generated for $\{Y_e\}$ and $\{X\}$ using measurements other than phase measurements.

In performing a linear regression, a transformation is found such that:

$$\{Y_e\} = a\{X\} + b, \quad (8)$$

where a and b are constants representing slope and offset, respectively. Manipulating Equation (8):

$$\{Y_e\} = \begin{bmatrix} x_1 & 1 \\ x_2 & 1 \end{bmatrix} \begin{bmatrix} a \\ b \end{bmatrix}^T \{c\}, \quad (9)$$

where [Z] is an augmented matrix constructed from $\{X\}$ and $\{c\}$ is a vector having a and b as respective first and second elements.

Equation (9) is in a form that allows computation of $\{c\}$. For the two-transducer example given, this could be achieved by premultiplying both sides of Equation (9) by $[Z]^{-1}$, as [Z] has an equal number of rows and columns. However, according to another aspect of the present invention, [Z] could represent an overdetermined system, i.e., [Z] could have more rows and columns. This could arise if measurements are made at more than two locations on the conduit, i.e., if $\{X\}$ has more than two elements.

In such an overdetermined case, Equation (9) can be solved by premultiplying both sides by the transpose of [Z]:

$$[Z]^T\{Y_e\} = ([Z]^T[Z])^{-1}\{c\}. \quad (10)$$

$[Z]^T[Z]$ is a square matrix, which for a physically well-posed problem has an inverse. Premultiplying both sides of Equation (8) by the inverse of $[Z]^T[Z]$ and solving for $\{c\}$:

$$\{c\} = ([Z]^T[Z])^{-1}[Z]^T\{Y_e\}. \quad (11)$$

The result $\{c\}$ represents a best fit of the vector $\{X\}$ to the complex eigenvector $\{Y_e\}$ according to a least squares criteria. The first element of $\{c\}$, the slope a, represents a scaling factor for a scaled rotation of $\{X\}$ to fit $\{Y_e\}$. For example, if $\{X\}$ and $\{Y_e\}$ are constructed from phase measurements, the mass flow rate $k_{unknown}$ corresponding to $\{X\}$ may be estimated from the known mass flow rate $k_{known}$ by:

$$k_{unknown} = \frac{k_{known}}{a}. \quad (12)$$

The use of overdetermined information sources to provide spatially integrated measurements of process parameters is described in a United States Patent Application entitled "Improved Vibrating Conduit Parameter Sensors and Methods of Operation Therefor Utilizing Spatial Integration", assigned to the assignee of the present application and filed concurrently herewith.

Exemplary Process Parameter Sensor

Referring again to FIG. 1, an embodiment of a process parameter sensor 5 according to the present invention includes a complex modal transformation estimator 30 and a process parameter estimator 40. Leads 100 connect the conduit assembly 10 to the driver 20 and the complex modal transformation estimator 30.

The complex modal transformation estimator 30 receives first and second motion signals representing motion of the conduits 103A, 103B, e.g., signals representing displacement, velocity or acceleration as a material flows through the conduit assembly 10, from the first and second motion transducers 105, 105' on first and second leads 111, 111', respectively. The complex transformation estimator 30 processes the received motion signals to estimate a complex modal transformation 35 relating the motion signals to a complex eigenvector representing motion of the conduits 103A, 103B at a known mass flow. The process parameter estimator 40 generates an estimate 45 of the unknown mass flow, e.g., an estimated mass flow rate, from the known mass flow according to the estimated complex modal transformation 35. These operations are discussed in detail below.

Figure 2:
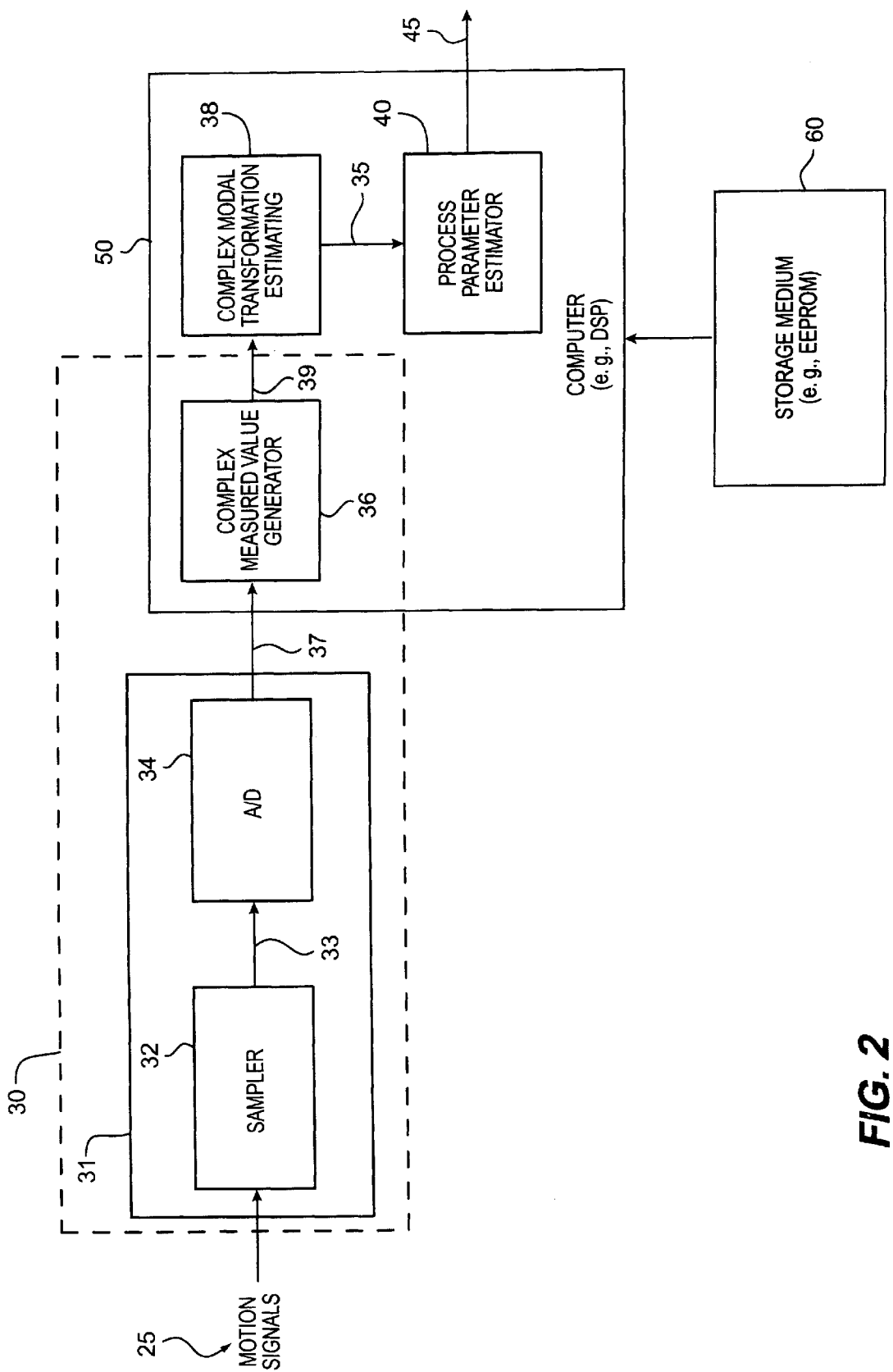
FIG. 2 illustrates embodiments of a complex modal transformation estimator and a means for estimating a process parameter according to an aspect of the present invention.

FIG. 2 illustrates an exemplary embodiment of the complex modal transformation estimator 30 and the process parameter estimator 40. As illustrated, the complex modal transformation estimator 30 includes a sampler 32, for example, a sample-and-hold or similar circuit, and an analog-to-digital converter (A/D) 34. The sampler 32 and the A/D 34 provide means 31 for receiving motion transducer motion signals 25 produced by the first and second motion transducers 105, 105', sampling the motion signals 25 and producing samples 33 therefrom which are converted to digital signal values 37 by the analog-to-digital converter (A/D) 34. Detailed operations of the illustrated sampler 32 and A/D 34 may be performed by a number of circuits known to those skilled in the art, and need not be discussed in greater detail herein. Those skilled in the art will appreciate that the receiving means 31 illustrated in FIG. 2 may be implemented in a number of ways, including additional presampling anti-alias filtering, postsampling filtering and the like. It will also be understood that, in general, the receiving means 31 illustrated in FIG. 2 may be implemented using special purpose hardware, firmware or software running on special or general-purpose data processing devices, or combinations thereof. Portions of the complex modal transformation estimator 30 may be embodied in a computer 50, e.g., a microprocessor, microcontroller, digital signal processor (DSP) or the like. For example, the computer 50 may comprise a pipelined DSP especially suited for linear algebraic computations, such as a DSP of the TMS320C4X family of DSPs sold by Texas Instruments, Inc. configured with appropriate program code, e.g., software and/or firmware and data stored, for example, in a storage medium 60 such as a random access memory (RAM), programmable read-only memory (EPROM), magnetic disk or the like, the computer 50 provides means 36 for generating complex measured values 39 from the digital signal values 37, the complex measured values representing motion of the conduits 103A, 103B. The computer 50 and associated program code also provide means 38 for estimating a complex modal transformation 35 from the complex measured values 39, the estimated complex modal transformation relating the complex measured values 39 to a complex eigenvector representing motion of the conduits 103A, 103B at a known mass flow.

The process parameter estimator 40 may also be embodied in the computer 50. Embodied, for example, as software or firmware running on the computer 50, the process parameter estimator 40 computes an estimate 45 of the unknown mass flow from the known mass flow according to the computed estimated complex modal transformation 35 produced by the complex modal transformation estimating means 38. Detailed discussion of apparatus, methods and program products for performing these operations are discussed in greater detail below with reference to the flowchart illustrations of FIGS. 3–5.

Those skilled in the art will appreciate that FIGS. 1–2 illustrate exemplary embodiments, and that a variety of other apparatus may be used with the present invention. For example, a variety of different conduit configurations other than that illustrated in FIG. 1 could be utilized, including straight and curved conduit configurations, as well as configurations employing a single conduit or multiple conduits. The driver 20, the complex modal transformation estimator 30 and the process parameter estimator 40 may be implemented in an integrated fashion, e.g., in an electronics package attached to the conduit assembly 10, or in a distributed fashion using components linked by appropriate communications media. Accordingly, a process parameter sensor as described herein need not be limited to a single package.

The complex modal estimator 30 and/or the process parameter estimator 40 may also be implemented as hardware and/or software modules designed to interface with an existing conduit assembly 10, including existing transducers 105A, 105B and associated wiring, thus providing an apparatus for retrofitting existing parameter sensor to incorporate complex modal measurement techniques. A driver 20 could also be integrated with such a module. Similarly, a "kit" could be provided which includes a complex modal transformation estimator 30, a process parameter estimator 40 and motion transducers designed to mount on an existing conduit structure. Although the complex modal transformation estimator 30 and the process parameter estimator 40 as described herein use digital computation techniques implemented on digital computing apparatus such as a DSP to perform estimation operations according to aspects of the present invention, those skilled in the art will appreciate that the complex modal transformation estimator 30 and/or the process parameter estimator 40 may include non-digital components, such as analog computing circuits, which perform all or some of these estimation operations.

Exemplary Implementation of Complex Modal Measurements

Figure 3:
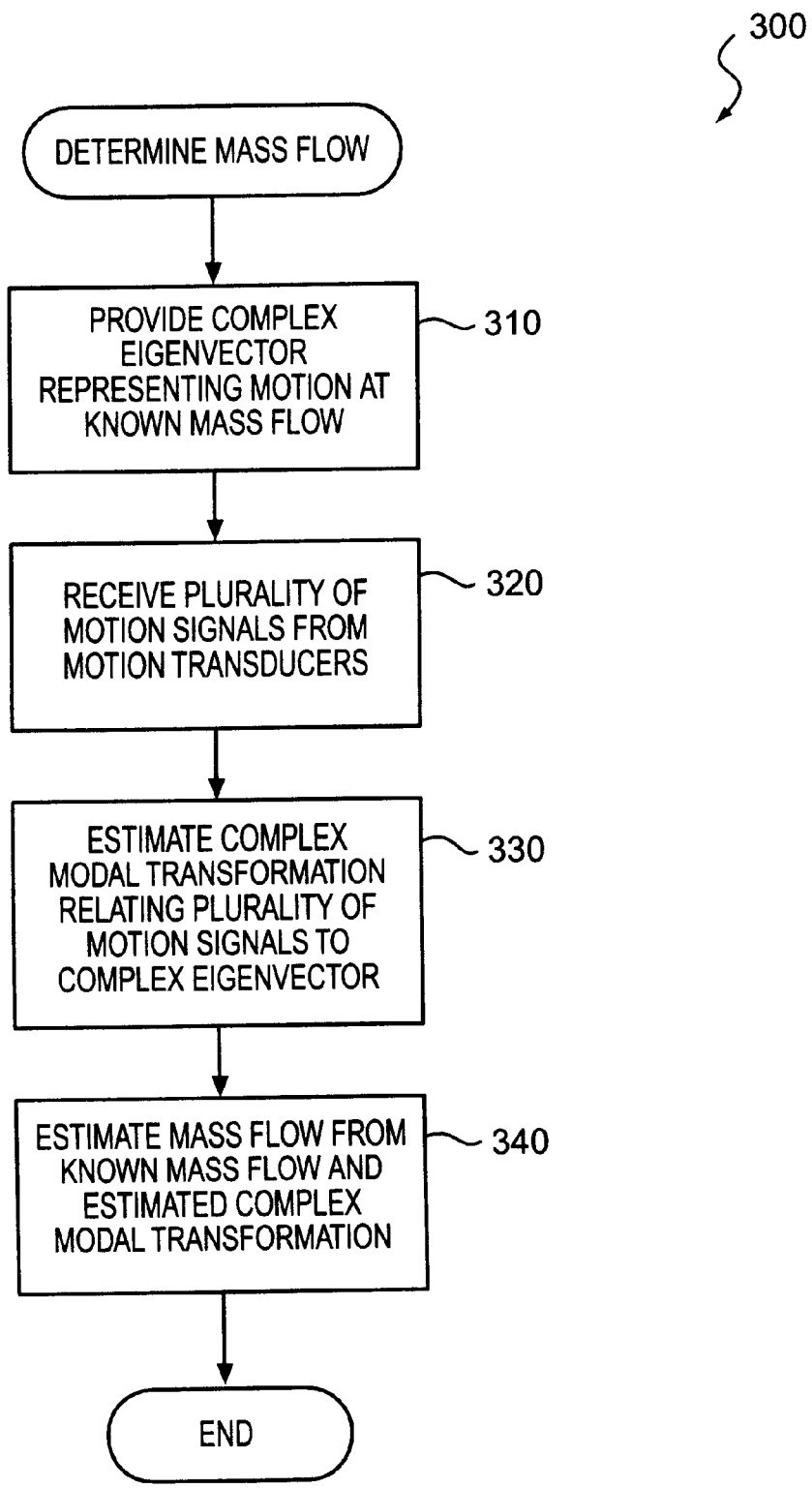
FIGS. 3–5 illustrate exemplary operations for estimating mass flow according to aspects of the present invention.
Figure 4:
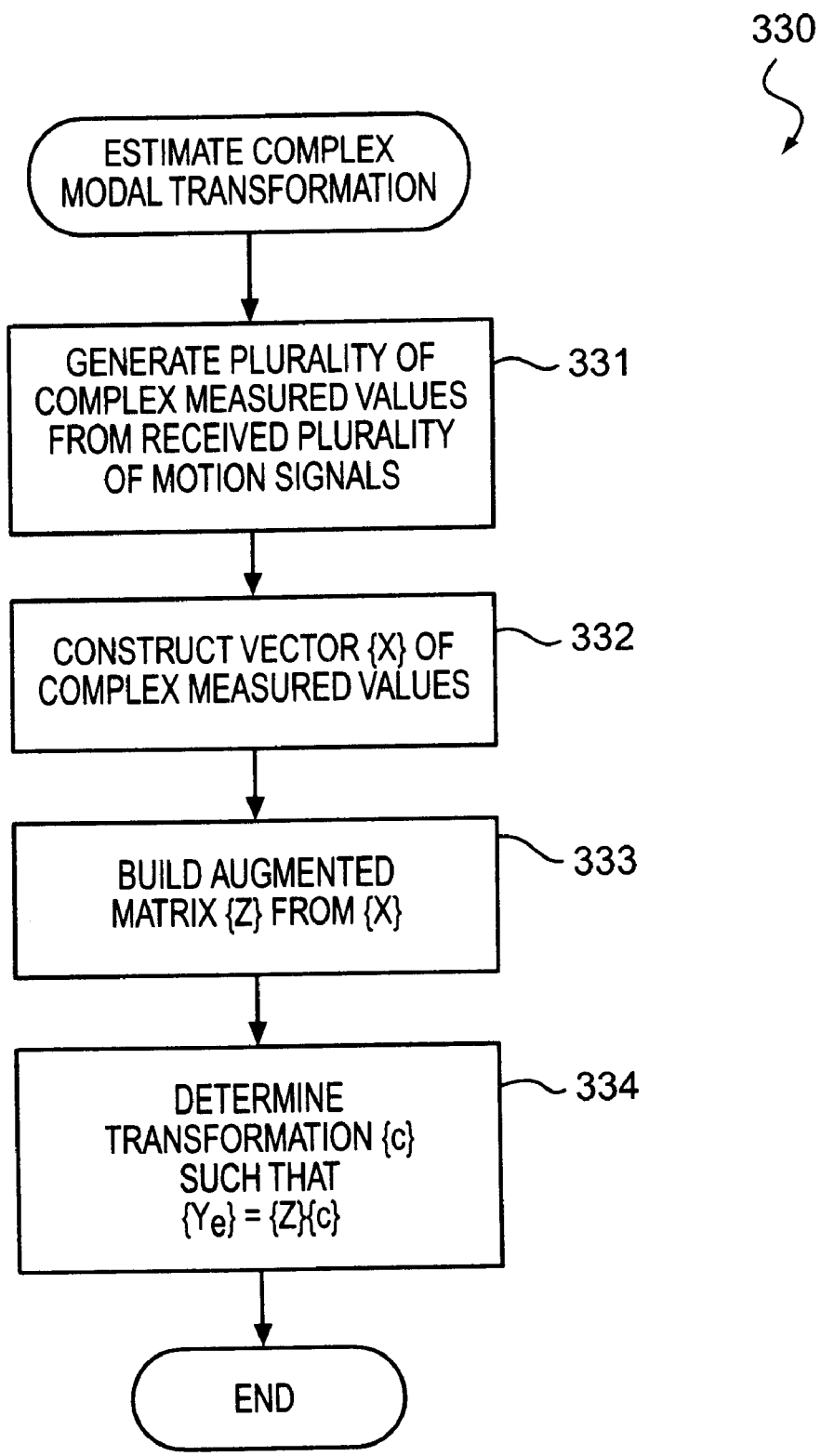
Figure 5:
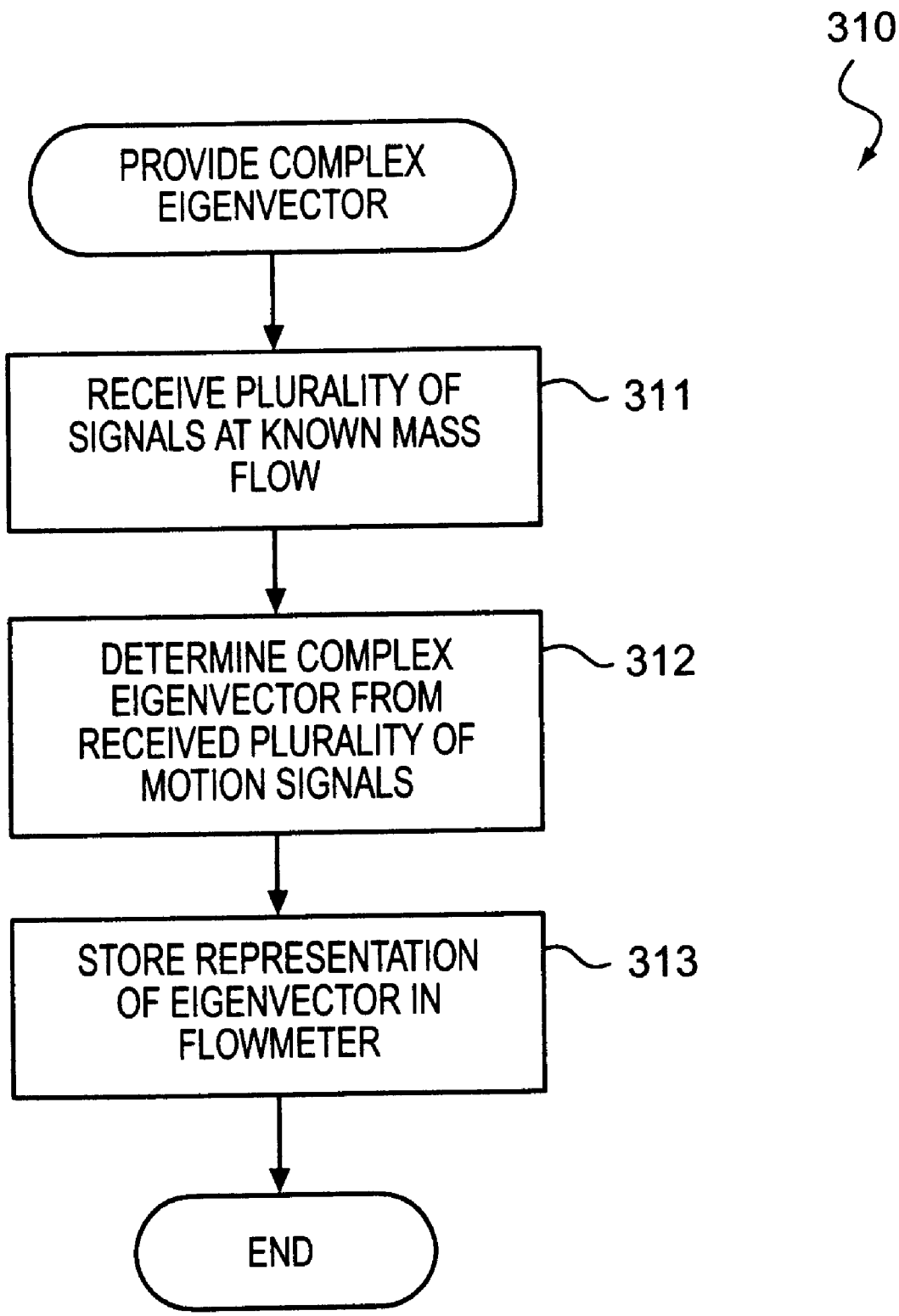

FIGS. 3–5 are flowchart illustrations of methods, apparatus (systems) and program products according to the invention. Blocks or combinations of blocks in the flowchart illustrations can be implemented using computer readable program code, e.g., program instructions and/or data operated on in a computer or data processor such as the computer 50 illustrated in FIG. 2. As used herein, computer readable program code may include but is not limited to such things as operating system commands (e.g., object code), high-level language instructions, and the like, as well as data which may be read, accessed or otherwise utilized in conjunction with such program instructions.

The program code may be loaded onto a computer or similar data processing apparatus including, but not limited to, a microprocessor, a microcontroller, a digital signal processor (DSP) or the like. The combination of the program code and computer may provide an apparatus that is operative to implement a function or functions specified in a block or blocks of the flowchart illustrations. Similarly, the program code may be loaded onto a computer or data processing device such that the program code and computer provide means for performing the function or functions specified in a flowchart block or blocks.

The program code may also be stored in a computer-readable storage medium such as a magnetic disk or tape, a bubble memory, a programmable memory device such as an electrically-erasable programmable read-only memory (EEPROM), or the like. The stored program code may direct a computer accessing the storage medium to function such that the program code stored in the storage medium forms an article of manufacture including program code means for implementing the function or functions specified in a flowchart block or blocks. The program code may also be loaded onto a computer to cause a series of operational steps to be performed, thereby implementing a process such that the program code, in conjunction with the computer, provides steps for implementing the functions specified in a flowchart block or blocks. Accordingly, blocks of the flowchart illustrations support apparatus operative to perform the specified functions, combinations of means for performing the specified functions, combinations of steps that perform the specified functions and computer readable program code means embodied in a computer-readable storage medium for performing the specified functions.

It will also be understood that, in general, each block of the flowchart illustrations, and combinations of blocks in the flowchart illustrations, can be implemented by special purpose hardware, software or firmware executing on a general purpose computer, or combinations thereof. For example, functions of the blocks of the flowchart illustrations may be implemented by an application specific integrated circuit (ASIC), programmable gate array or similar special purpose device, or by program instructions and data loaded on and executed by a microprocessor, microcontroller, DSP or other general-purpose computing device.

FIG. 3 illustrates exemplary operations 300 for determining mass flow in a vibrating conduit type process parameter sensor. A complex eigenvector is provided (Block 310), the complex eigenvector representing motion of the process parameter sensor conduit at a known mass flow. A plurality of motion signals is received from a plurality of motion transducers (Block 320), the motion signals representing motion of the conduit at the plurality of locations as material flows through the conduit. A complex modal transformation relating the motion signals to the complex eigenvector is estimated (Block 330), for example, using the linear regression technique discussed above. Mass flow is then estimated from the known mass flow and the estimated complex modal transformation (Block 340).

FIG. 4 illustrates exemplary operations 330 for estimating a complex modal transformation relating the plurality of motion signals from the motion transducers to the complex eigenvector $\{Y_e\}$, in particular, estimation operations incorporating a linear regression. A plurality of complex measured values is generated from the received plurality of motion signals (Block 331). A vector $\{X\}$ is constructed from the plurality of complex measured values (Block 332). An augmented matrix $[Z]$ is constructed from the vector $\{X\}$ (Block 333). A transformation $\{c\}$ is then determined such that $\{Y_e\}=[Z]\{c\}$ (Block 334).

FIG. 5 illustrates exemplary operations 310 for providing a complex eigenvector representing motion of a process parameter sensor conduit at a known mass flow. A plurality of motion signals is received from a plurality of transducers positioned at a plurality of locations on the conduit (Block 311), the plurality of motion signals representing motion of the process parameter sensor conduit at a known mass flow. A complex eigenvector representing motion of the conduit at the known mass flow rate is then determined from the plurality of complex calibrated values (Block 312). A representation of the complex eigenvector is then stored in the process parameter sensor (Block 314), for example, in the storage medium 60 illustrated in FIG. 2.

The drawings and specification of the present application disclose embodiments of the invention. Although specific terms are employed, they are used in a generic and descriptive sense only and not for purposes of limitation. It is expected that persons skilled in the art can and will make, use or sell alternative embodiments that are within the scope of the following claims either literally or under the Doctrine of Equivalents.

That which is claimed is:

1. A method of determining a process parameter in a parameter sensor having a conduit configured to contain material from a material processing system, the method comprising the steps of:

receiving a plurality of motion signals from a plurality of motion transducers operatively associated with the conduit, the plurality of motion signals representing motion at a plurality of locations on the conduit;

providing a complex eigenvector representing motion of the conduit at the plurality of locations at a known mass flow, estimating a first complex modal transformation from the received plurality of motion signals wherein said first complex modal transformation relates said plurality of motion signals to said complex eigenvector; and estimating mass flow through the conduit from the known mass flow and the first complex modal transformation.

2. A method according to claim 1, wherein said step of estimating the first complex modal transformation comprises the steps of:

generating a plurality of complex measured values from the received plurality of motion signals, a respective one of the plurality of complex measured values corresponding to a respective one of the plurality of locations; and estimating a second complex modal transformation relating the generated plurality of complex measured values to the complex eigenvector.

3. A method according to claim 2, wherein said step of estimating the second complex modal transformation comprises the steps of:

constructing a complex vector from the generated plurality of complex measured values; and determining a scaled rotation relating the complex vector to the complex eigenvector.

4. A method according to claim 2, wherein said step of estimating the second complex modal transformation comprises the step of determining a scaling factor relating the plurality of complex measured values to the complex eigenvector.

5. A method according to claim 2:

wherein said step of estimating the second complex modal transformation comprises the step of determining a third transformation which best fits the plurality of complex measured values to the complex eigenvector; and wherein said step of estimating mass flow comprises the step of estimating mass flow from the known mass flow according to the third transformation.

6. A method according to claim 5, wherein said step of determining the third complex modal transformation comprises the step of performing a linear regression to determine the third transformation which best fits the plurality of complex measured values to the complex eigenvector.

7. A method according to claim 5 wherein said step of providing a complex eigenvector comprises the step of providing a plurality of complex calibrated values representing motion of the conduit at the known mass flow; and wherein said step of determining the third complex modal transformation comprises the step of performing a linear regression to determine a fourth transformation relating the plurality of complex calibrated values to the plurality of complex measured values.

8. A method according to claim 5, wherein said step of determining the third transformation comprises the step of determining the third transformation which optimally fits the plurality of complex measured values to the complex eigenvector according to a least squares criteria.

9. A method according to claim 2:

wherein said step of receiving said plurality of motion signals comprises the step of receiving a plurality of motion signals representing motion at more than two physically separate locations; and wherein said step of estimating the first complex modal transformation comprises the step of estimating the first complex modal transformation relating the plurality of motion signals representing motion at the more than two physically separate locations to the complex eigenvector.

10. A method according to claim 2:
wherein said step of receiving the plurality of motion signals comprises the step of receiving a plurality of motion signals representing motion at more than two physically separate locations;
wherein said step of generating the plurality of complex measured values comprises the step of generating more than two complex measured values; and
wherein said step of estimating the second complex modal transformation comprises the step of estimating a second complex modal transformation relating the more than two complex measured values to the complex eigenvector.

11. A method according to claim 2, wherein said step of generating a plurality of complex measured values comprises the step of generating a measured phase value corresponding to one of the plurality of locations.

12. A method according to claim 2, wherein said step of generating a plurality of complex measured values comprises the step of generating a measured amplitude value corresponding to one of the plurality of locations.

13. A method according to claim 1, wherein said step of providing the complex eigenvector comprises the step of providing a plurality of complex calibrated values representing motion of the conduit at the known mass flow.

14. A method according to claim 1, wherein said step of providing the complex eigenvector comprises the steps of:
receiving the plurality of motion signals from the plurality of motion transducers, the plurality of motion signals indicating motion at the plurality of locations at the known mass flow;
determining the complex eigenvector from the received plurality of motion signals; and
storing a representation of the complex eigenvector.

15. A method according to claim 1, wherein said step of providing the complex eigenvector comprises the step of storing a representation of the complex eigenvector.

16. A vibrating conduit parameter sensor for determining a process parameter in a material processing system, the sensor comprising:
a conduit configured to contain material from the material processing system;
a plurality of motion transducers operative to produce a plurality of motion signals indicating motion at a plurality of locations on said conduit;
a complex modal transformation estimator that receives the plurality of motion signals from said plurality of motion transducers and that estimates a first complex modal transformation from said plurality of motion signals wherein said first complex modal transformation relates the plurality of motion signals to a complex eigenvector representing motion of said conduit at a known mass flow; and
a process parameter estimator that is responsive to an estimation of said first complex modal transformation to estimate mass flow through the conduit from the known mass flow and the estimated first complex modal transformation.

17. A sensor according to claim 16, wherein said complex modal transformation estimator comprises:
means for receiving the plurality of motion signals from the plurality of motion transducers;
means, responsive to a reception of said plurality of motion signals, for generating a plurality of complex measured values from the received plurality of motion signals; and
means, responsive to said plurality of complex measured values being generated, for estimating a second complex modal transformation which relates the generated plurality of complex measured values to the complex eigenvector.

18. A sensor according to claim 17, wherein said means for estimating the second complex modal transformation comprises:
means for constructing a complex vector from the generated plurality of complex measured values; and
means, responsive to the complex vector being constructed, for determining a scaled rotation that relates the complex vector to the complex eigenvector.

19. A sensor according to claim 17:
wherein said means for estimating the second complex modal transformation comprises means for determining a scaling factor relating the plurality of complex measured values to the complex eigenvector; and
wherein said means for estimating mass flow comprises means for estimating mass flow from the known mass flow and the computed scaling factor.

20. A sensor according to claim 17:
wherein said means for estimating the second complex modal transformation comprises means for determining a third transformation which best fits the plurality of complex measured values to the complex eigenvector; and
wherein said means for estimating mass flow comprises means for estimating mass flow from the known mass flow according to the third transformation.

21. A sensor according to claim 20, wherein said means for determining the third transformation comprises means for performing a linear regression to determine the third transformation which best fits the plurality of complex measured values to the complex eigenvector.

22. A sensor according to claim 20, further comprising means for providing a plurality of complex calibrated values representing motion of the conduit at the known mass flow, and wherein said means for determining the third tranformation comprises means for performing a linear regression to determine a fourth transformation relating the plurality of complex calibrated values to the plurality of complex measured values.

23. A sensor according to claim 20, wherein said means for determining the third transformation comprises the step of determining the third transformation which optimally fits the plurality of complex measured values to the complex eigenvector according to a least squares criteria.

24. A sensor according to claim 17:
wherein said plurality of motion transducers is operative to produce the plurality of motion signals which represent motion at a more than two physically separate locations on said conduit;
wherein said means for generating the plurality of complex measured values comprises means for generating more than two complex measured values from the received plurality of motion signals representing motion at the more than two physically separate locations; and
wherein said means for estimating the second complex modal transformation comprises means for estimating the second complex modal transformation relating the more than two complex measured values to the complex eigenvector.

25. A sensor according to claim 17, wherein said means for generating the plurality of complex measured values comprises means for generating a measured phase value corresponding to one of said plurality of locations.

26. A sensor according to claim 17, wherein said means for generating the plurality of complex measured values comprises means for generating a measured amplitude value corresponding to one of said plurality of locations.

27. A sensor according to claim 16:
wherein said plurality of motion transducers is operative to produce the plurality of motion signals representing motion at more than two physically separate locations on said conduit; and
wherein said complex modal transformation estimator receives the plurality of motion signals representing motion at the more than two physically separate locations and estimates the first complex modal transformation relating the received plurality of motion signals representing motion at the more than two physically separate locations to the complex eigenvector.

28. A sensor according to claim 16 further comprising means for storing a representation of the complex eigenvector.

29. An apparatus for determining a process parameter associated with a material flowing through a conduit from a plurality of motion signals representing motion of the conduit at a plurality of locations thereon, the apparatus comprising:
a complex modal transformation estimator that receives the plurality of motion signals from a plurality of motion transducers associated with said conduit and estimates a first complex modal transformation from the received plurality of motion signals wherein said first complex modal transformation relates the received plurality of motion signals to a complex eigenvector representing motion of said conduit at a known mass flow; and
a process parameter estimator that estimates mass flow of the material through said conduit from the known mass flow and the estimated first complex modal transformation responsive to an estimation of said first complex modal transformation.

30. An apparatus according to claim 29, wherein said complex modal transformation estimator comprises:
means for receiving the plurality of motion signals;
means, responsive to a reception of said plurality of motion signals, for generating a plurality of complex measured values from the received plurality of motion signals; and
means, responsive to said plurality of complex values being generated, for estimating a second complex modal transformation relating the generated plurality of complex measured values to the complex eigenvector.

31. An apparatus according to claim 30, wherein said means for estimating the second complex modal transformation comprises:
means for constructing a complex vector from the generated plurality of complex measured values; and
means, responsive to the complex vector being constructed, for determining a scaled rotation that relates the complex vector to the complex eigenvector.

32. An apparatus according to claim 30:
wherein said means for estimating the second complex modal transformation comprises means for determining a scaling factor relating the plurality of complex measured values to the complex eigenvector; and
wherein said means for estimating the mass flow comprises means for estimating mass flow from the known mass flow and the computed scaling factor.

33. An apparatus according to claim 30:
wherein said means for estimating the second complex modal transformation comprises means for determining a third transformation which best fits the plurality of complex measured values to the complex eigenvector; and
wherein said means for estimating the mass flow comprises means for estimating mass flow from the known mass flow according to the third transformation.

34. An apparatus according to claim 33, wherein said means for determining the third transformation comprises means for performing a linear regression to determine the third transformation which best fits the plurality of complex measured values to the complex eigenvector.

35. An apparatus according to claim 33, further comprising means for providing a plurality of complex calibrated values representing motion of the conduit at the known mass flow, and wherein said means for determining the third transformation comprises means for performing a linear regression to determine a fourth transformation relating the plurality of complex calibrated values to the plurality of complex measured values.

36. An apparatus according to claim 33, wherein said means for determining the third transformation comprises the step of determining the third transformation which optimally fits the plurality of complex measured values to the complex eigenvector according to a least squares criteria.

37. An apparatus according to claim 30, wherein the plurality of motion signals represent at more than two physically seperate locations on the conduit, and wherein said complex modal transformation estimator receives the plurality of motion signals representing motion at the more than two physically separate locations and estimates the first complex modal transformation relating the received plurality of motion signals representing motion at the more than two physically separate locations to the complex eigenvector.

38. An apparatus according to claim 30, wherein the plurality of motion signals represent motion at more than two physically separate locations on the conduit, and:
wherein said means for generating the plurality of complex measured values comprises means for generating more than two complex measured values from the received plurality of motion signals representing motion at the more than two physically separate locations; and
wherein said means for estimating the second complex modal transformation comprises means for estimating the second complex modal transformation relating the more than two complex measured values to the complex eigenvector.

39. An apparatus according to claim 30, wherein said means for generating the plurality of complex measured values comprises means for generating a measured phase value corresponding to one of said plurality of locations.

40. An apparatus according to claim 30, wherein said means for generating the plurality of complex measured values comprises means for generating a measured amplitude value corresponding to one of said plurality of locations.

41. An apparatus according to claim 30 further comprising means for storing a representation of the complex eigenvector.

42. A computer program product for determining a process parameter associated with a material flowing through a conduit of a parameter sensor in a material processing system, the computer program product comprising:

a computer readable storage medium having computer readable program code means embodied in said medium, said computer readable program code means comprising:

first computer readable program code means for receiving a plurality of motion signals representing motion at a plurality of locations on the conduit from a plurality of motion transducers associated with the conduit;

second computer readable program code means, responsive to a reception of said plurality of motion signals, for estimating a first complex modal transformation from the received plurality of motion signals and a complex modal eigenvector representing motion of the conduit at the plurality of locations at a known mass flow wherein said first complex modal transformation relates the received plurality of motion signals to the complex eigenvector; and third computer readable program code means, responsive to an estimation of said first complex modal transformation, for estimating mass flow from the known mass flow and the first complex modal transformation.

43. A computer program product according to claim 42, wherein said second computer readable program code means comprises:

computer readable program code means for generating a plurality of complex measured values from the received plurality of motion signals wherein each one of the plurality of complex measured values corresponds to a respective one of the plurality of locations; and computer readable program code means for estimating a second complex modal transformation relating the generated plurality of complex measured values to the complex eigenvector.

44. A computer program product according to claim 43, wherein said second computer readable program code means comprises:

computer readable program code means for constructing a complex vector from the generated plurality of complex measured values; and computer readable program code means for determining a scaled rotation relating the complex vector to the complex eigenvector.

45. A computer program product according to claim 43, wherein said second computer readable program code means comprises computer readable program code means for determining a scaling factor relating the plurality of complex measured values to the complex eigenvector.

46. A computer program product according to claim 43:

wherein said second computer readable program code means comprises computer readable program code means for determining a third transformation which best fits the plurality of complex measured values to the complex eigenvector; and wherein said third computer readable program code means comprises computer readable program code means for estimating mass flow from the known mass flow according to the third transformation.

47. A computer program product according to claim 46, wherein said second computer readable program code means comprises computer readable program code means for performing a linear regression to determine the third transformation which best fits the plurality of complex measured values to the complex eigenvector.

48. A computer program product according to claim 46:

wherein said second computer readable program code means comprises computer readable program code means for providing a plurality of complex calibrated values representing motion of the conduit at the known mass flow; and wherein said second computer readable program code means comprises computer readable program code means for performing a linear regression to determine a fourth transformation relating the plurality of complex calibrated values to the plurality of complex measured values.

49. A computer program product according to claim 46, wherein said second computer readable program code means comprises computer readable program code means for determining the third transformation which optimally fits the plurality of complex measured values to the complex eigenvector according to a least squares criteria.

50. A computer program product according to claim 43:

wherein said first computer readable program code means comprises computer readable program code means for receiving a plurality of motion signals representing motion at more than two physically separate locations; and wherein said second computer readable program code means comprises computer readable program code means for estimating the first complex modal transformation relating the plurality of motion signals representing motion at the more than two physically separate locations to the complex eigenvector.

* * * * *

UNITED STATES PATENT AND TRADEMARK OFFICE
CERTIFICATE OF CORRECTION

PATENT NO. : 6,427,127 B1
DATED : July 30, 2002
INVENTOR(S) : Timothy J. Cunningham It is certified that error appears in the above-identified patent and that said Letters Patent is hereby corrected as shown below:

Column 2,
Line 37, replace "invention, a At variety of different types of measurements" with
-- invention, a variety of different types of measurements --
Line 47, replace "of motion signals indicating motion at one of a" with
-- of motion signals indicates motion at one of a --

Column 8,
Line 11, replace "$[Z]^r\{Y_e\} = ([Z]^r[Z])^{-1} \{c\}\cdot$" with -- $[Z]^T \{Y_e\} = ([Z]^T[Z])^{-1} \{c\}\cdot$ --
Line 16, replace "$\{c\} = ([Z]^r[Z])^{-1}[Z]^r \{Y_e\}\cdot$" with -- $\{c\} = ([Z]^T[Z])^{-1}[Z]^T \{Y_e\}\cdot$ --

Column 14,
Line 44, replace "and wherein said means for determining the third tranfor-" with
-- and wherein said means for determining the third transfor- --
Lines 57 and 58, replace "to produce the plurality of motion signals which represent motion at a more than two physically separate" with -- to produce the plurality of motion signals representing motion at more than two physically separate --
Lines 60-67 and Column 15, lines 1-3, replace "wherein said means for generating the plurality of com-
    plex measured values comprises means for generating
    more than two complex measured values from the
    received plurality of motion signals representing
    motion at the more than two physically separate loca-
    tions; and
  wherein said means for estimating the second complex
    modal transformation comprises means for estimating
    the second complex modal transformation relating the
    more than two complex measured values to the com-
    plex eigenvector. "
with -- wherein said complex modal transformation estimator receives the
    plurality of motion signals representing motion at the more than two physically
    separate locations and estimates the first complex modal transformation
    relating the received plurality of motion signals representing motion at the
    more than two physically separate locations to the complex eigenvector. --

UNITED STATES PATENT AND TRADEMARK OFFICE
CERTIFICATE OF CORRECTION

PATENT NO. : 6,427,127 B1
DATED : July 30, 2002
INVENTOR(S) : Timothy J. Cunningham It is certified that error appears in the above-identified patent and that said Letters Patent is hereby corrected as shown below:

Column 15,
Lines 4-7, replace "25. A sensor according to claim 17, wherein said means for generating the plurality of complex measured values comprises means for generating a measured phase value corresponding to one of said plurality of locations."
with -- 25. A sensor according to claim 17:
 wherein said plurality of motion transducers is operative to produce the plurality of motion signals which represent motion at a more than two physically separate locations on said conduit;
 wherein said means for generating the plurality of complex measured values comprises means for generating more than two complex measured values from the received plurality of motion signals representing motion at the more than two physically separate locations; and
 wherein said means for estimating the second complex modal transformation comprises means for estimating the second complex modal transformation relating the more than two complex measured values to the complex eigenvector. --

Lines 8-11,
replace "26. A sensor according to claim 17, wherein said means for generating the plurality of complex measured values comprises means for generating a measured amplitude value corresponding to one of said plurality of locations."
with -- 26. A sensor according to claim 17, wherein said means for generating the plurality of complex measured values comprises means for generating a measured phase value corresponding to one of said plurality of locations. --

Lines 12-23, replace "27. A sensor according to claim 16:
 wherein said plurality of motion transducers is operative to produce the plurality of motion signals representing motion at more than two physically separate locations on said conduit; and
 wherein said complex modal transformation estimator receives the plurality of motion signals representing motion at the more than two physically separate locations and estimates the first complex modal transformation relating the received plurality of motion signals representing motion at the more than two physically separate locations to the complex eigenvector."
with -- 27. A sensor according to claim 17, wherein said means for generating the plurality of complex measured values comprises means for generating a measured amplitude value corresponding to one of said plurality of locations. --

UNITED STATES PATENT AND TRADEMARK OFFICE
CERTIFICATE OF CORRECTION

PATENT NO.    : 6,427,127 B1
DATED         : July 30, 2002
INVENTOR(S)   : Timothy J. Cunningham It is certified that error appears in the above-identified patent and that said Letters Patent is hereby corrected as shown below:

<u>Column 16,</u>
Lines 34 and 35, replace "plurality of motion signals represent at more than two physically separate locations on the conduit, and wherein" with -- plurality of motion signals represent motion at more than two physically separate locations on the conduit, and wherein --

Signed and Sealed this

Sixth Day of May, 2003

JAMES E. ROGAN
*Director of the United States Patent and Trademark Office*